United States Patent
Wilson et al.

(10) Patent No.: US 11,726,824 B2
(45) Date of Patent: Aug. 15, 2023

(54) SYSTEM WITH MULTIPLE ELECTRONIC DEVICES

(71) Applicant: Apple Inc., Cupertino, CA (US)

(72) Inventors: James R. Wilson, Saratoga, CA (US); David A. Pakula, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/522,730

(22) Filed: Nov. 9, 2021

(65) Prior Publication Data
US 2022/0083382 A1 Mar. 17, 2022

Related U.S. Application Data

(63) Continuation of application No. 16/803,657, filed on Feb. 27, 2020, now Pat. No. 11,175,956, which is a (Continued)

(51) Int. Cl.
*G06F 9/50* (2006.01)
*H01F 7/02* (2006.01)
(Continued)

(52) U.S. Cl.
CPC .......... *G06F 9/5027* (2013.01); *G06F 9/5061* (2013.01); *H01F 7/02* (2013.01);
(Continued)

(58) Field of Classification Search
CPC .......................... G06F 9/5027; G06F 9/5061; H04M 1/72409; H04M 1/72454; H04M 1/04; H01F 7/02; H01F 7/0252
See application file for complete search history.

(56) References Cited

U.S. PATENT DOCUMENTS 9,377,989 B2 6/2016 Li et al.
9,477,394 B2 10/2016 Sirpal et al.
(Continued)

OTHER PUBLICATIONS

Aguilar (NPL "Send Just About Anything from Your Phone to Your TV via Chromecast" by Nelson Aguilar, published Mar. 28, 2014, retrieved from https://cord-cutters.gadgethacks.com/how-to/send-just-about-anything-from-your-phone-your-tv-via-chromecast-0152828/, retrieved on Feb. 14, 2023. (Year: 2014).*
(Continued)

*Primary Examiner* — Michael A Keller
(74) *Attorney, Agent, or Firm* — Treyz Law Group, P.C.; G. Victor Treyz; Kendall P. Woodruff

(57) ABSTRACT

Multiple electronic devices may be used together in a system. The electronic devices may use sensor measurements and other information to detect when an edge of a first electronic device is adjacent to an edge of a second electronic device. In response to detection of adjacency between the edges of the first and second devices, the devices may transition from an independent operating mode in which each device operates separately to a joint operating mode in which resources of the devices are shared. In the joint operating mode, images may extend across displays in the devices, speakers in the devices may be used to play different channels of an audio track, cameras and other sensors may be used in cooperation with each other, and other resources may be shared. Magnetic components may hold devices together in a variety of orientations.

19 Claims, 9 Drawing Sheets

Related U.S. Application Data continuation of application No. 15/628,946, filed on Jun. 21, 2017, now Pat. No. 10,585,708.

(60) Provisional application No. 62/474,533, filed on Mar. 21, 2017.

(51) Int. Cl.
  *H04M 1/72409* (2021.01)
  *H04M 1/72454* (2021.01)
  *H04M 1/72412* (2021.01)
  *H04M 1/02* (2006.01)

(52) U.S. Cl.
  CPC ... *H04M 1/72409* (2021.01); *H04M 1/72454* (2021.01); *H04M 1/0268* (2013.01); *H04M 1/72412* (2021.01); *H04M 1/724095* (2022.02)

(56) References Cited

U.S. PATENT DOCUMENTS

| | | | |
|---|---|---|---|
| 9,767,681 B2 | 9/2017 | Hope et al. | |
| 2013/0111369 A1 | 5/2013 | Pasquero et al. | |
| 2013/0225078 A1* | 8/2013 | Johansson | H04W 76/10 455/41.2 |
| 2014/0032635 A1 | 1/2014 | Pimmel et al. | |
| 2015/0046505 A1 | 2/2015 | Sun et al. | |
| 2015/0082347 A1* | 3/2015 | Pan | H04N 21/812 725/38 |
| 2015/0135206 A1* | 5/2015 | Reisman | H04H 20/93 725/18 |
| 2015/0138102 A1 | 5/2015 | Chang et al. | |
| 2016/0078840 A1 | 3/2016 | Kusaka et al. | |
| 2016/0106936 A1* | 4/2016 | Kimmel | A24F 40/485 392/404 |
| 2016/0313875 A1 | 10/2016 | Williams et al. | |
| 2017/0277498 A1 | 9/2017 | Wood, Jr. et al. | |
| 2018/0232195 A1 | 8/2018 | Jaegal et al. | |
| 2020/0307473 A1* | 10/2020 | Pividori | B60R 16/023 |

OTHER PUBLICATIONS

Tandler et al., ConnecTables: Dynamic Coupling of Display for the Flexible Creation of Shared Workspaces, Proceedings of the 14, Annual ACM Symposium on User Interface Software and Technology, 2001, pp. 11-20.

Aguilar, Send Just About Anything from Your Phone to Your TV via Chromecast, Mar. 28, 2014.

Dubey, 6 Ways to share content from your phone to your TV, Sep. 30, 2014.

* cited by examiner

SYSTEM WITH MULTIPLE ELECTRONIC DEVICES

This application is a continuation of patent application Ser. No. 16/803,657, filed Feb. 27, 2020, which is a continuation of patent application Ser. No. 15/628,946, filed Jun. 21, 2017, which claims the benefit of provisional patent application No. 62/474,533, filed Mar. 21, 2017, all of which are hereby incorporated by reference herein in their entireties.

BACKGROUND

This relates generally to electronic devices, and, more particularly, to systems that include multiple electronic devices.

Electronic devices such as cellular telephones are often used in isolation. For example, a user may present a video or book on the display of a single electronic device. Using devices in isolation can be unsatisfactory. For example, devices that operate independently are not able to help each other when presenting a video or book to a user.

SUMMARY

Multiple electronic devices may be used together in a system. The electronic devices may use sensor measurements and other information to detect when an edge of a first device is adjacent to an edge of a second electronic device. In response to detection of adjacency between the edges of the first and second devices, the devices may transition from an independent operating mode in which each device operates separately to a joint operating mode in which resources of the devices are shared. In the joint operating mode, images may extend across displays in the devices, speakers in respective devices may be used to play different channels of an audio track, cameras and sensors in different devices may be used in cooperation with each other, and other resources may be shared.

Magnetic components may hold devices together in a variety of orientations. The magnetic components may operate in cooperation with beveled housing edges and other structures to help hold devices in planar configurations in which the devices lie in a common plane and non-planar configurations in which the devices are oriented at a non-zero angle with respect to each other.

Control circuitry in the devices may alter the operating modes of the devices in response to user input, sensor measurements, and information on the previous operating states of the devices. When transitioning to independent operation following joint operation, some of the joint operating settings of the devices may be retained by the separated devices.

DETAILED DESCRIPTION

One or more users may use multiple electronic devices together. The electronic devices may sometimes be operated independently. When brought together, content may be displayed across the displays of the devices and other joint operations may be performed.

Figure 1:
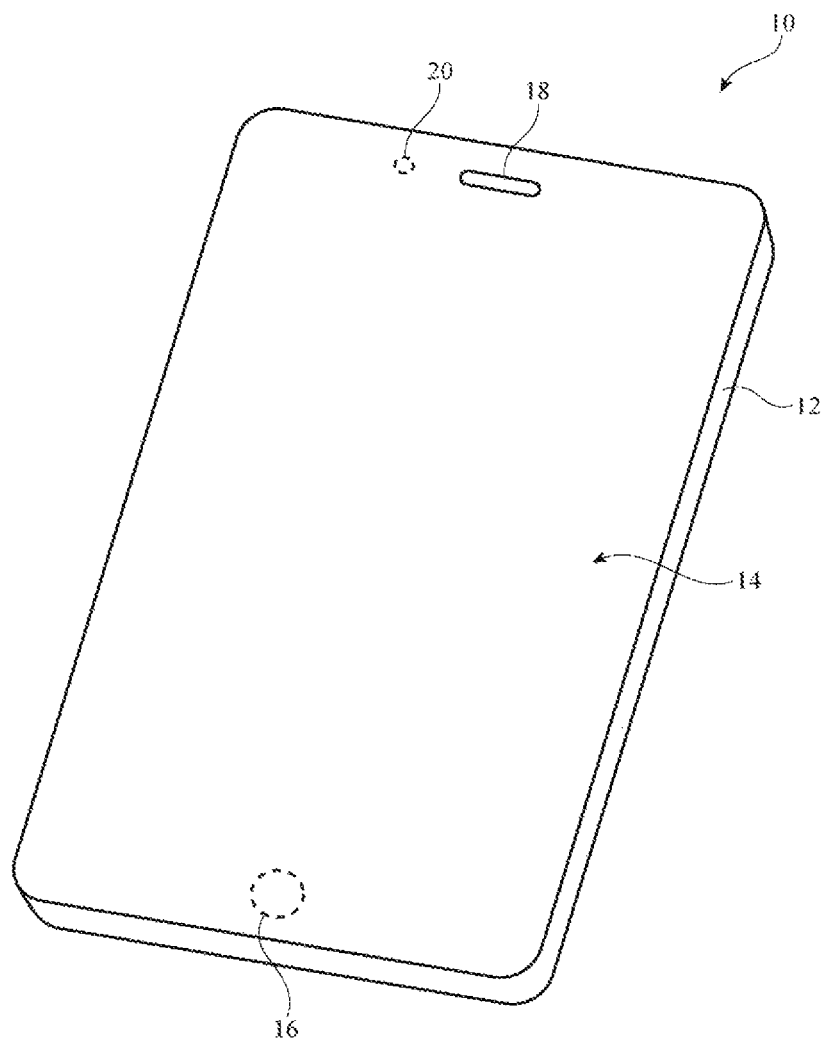
FIG. 1 is a perspective view of an illustrative electronic device in accordance with an embodiment.

An illustrative electronic device of the type that may be used in a system with multiple electronic devices is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 has opposing front and rear faces and peripheral sidewalls that run around the periphery of device 10. Device 10 includes a display such as display 14 on the front face of device 10 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have vertical sidewalls, curved sidewalls, sidewalls with one or more beveled (angled) portions, sidewalls that are uncovered by display 14, sidewalls that are partly or fully covered by portions of display 14, and/or other suitable sidewall structures. The rear face of device 10 may be covered with housing 12. Configurations in which a display such as display 14 is formed on the rear face of housing 12 (e.g., in addition to display 14 on the front face of device 10) may also be used.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels or other light-emitting diodes, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate optional speaker port 18. Openings may also be formed in housing 12 to form communications ports (e.g., an audio jack port, a digital data port, etc.), to form openings for buttons, etc. If desired, a touch sensor, fingerprint sensor, dome-switch button or other input device such as input device 16 may be formed on the front face of device 10 (e.g., within an opening in the display cover layer, under the display cover layer in a configuration in which the display cover layer does not contain any button openings, etc.).

Display 14 may have an active area and an inactive area. The active area may, as an example, be formed in a rectangular central portion of the front face of device 10. The active area contains pixels that display images for a user of device 10. Inactive border regions (areas without pixels) may be formed along one or more of the edges of the active area. For example, the active area may be bordered on the left and right and top and bottom by inactive display areas. In other configurations, the active area of display 14 may cover all of the front face of device 10, may cover the front face of device 10 and some or all of the sidewalls of device 10, may have inactive borders at the upper and lower ends of device 10 while being borderless along the left and right edges of device 10, or may have other layouts.

Components such as light sensors (e.g., light-sensors in proximity sensors, ambient light sensors, etc.), cameras (e.g., digital image sensors that capture images), status indicator lights (e.g., light-emitting diodes), and other components may be mounted under windows in display 14 such as windows 20 or other portions of device 10. Sensors such as proximity sensor light sensors may be mounted under a layer of visible-light-blocking and infrared-light-transparent material. Sensors such as ambient light sensors and other components that use visible light such as cameras and status indicator lights may be mounted under windows that are transparent to visible light. Light-based components such as these may also be mounted on the rear face of device 10, on device sidewalls, or in other portions of structures of device 10.

Figure 2:
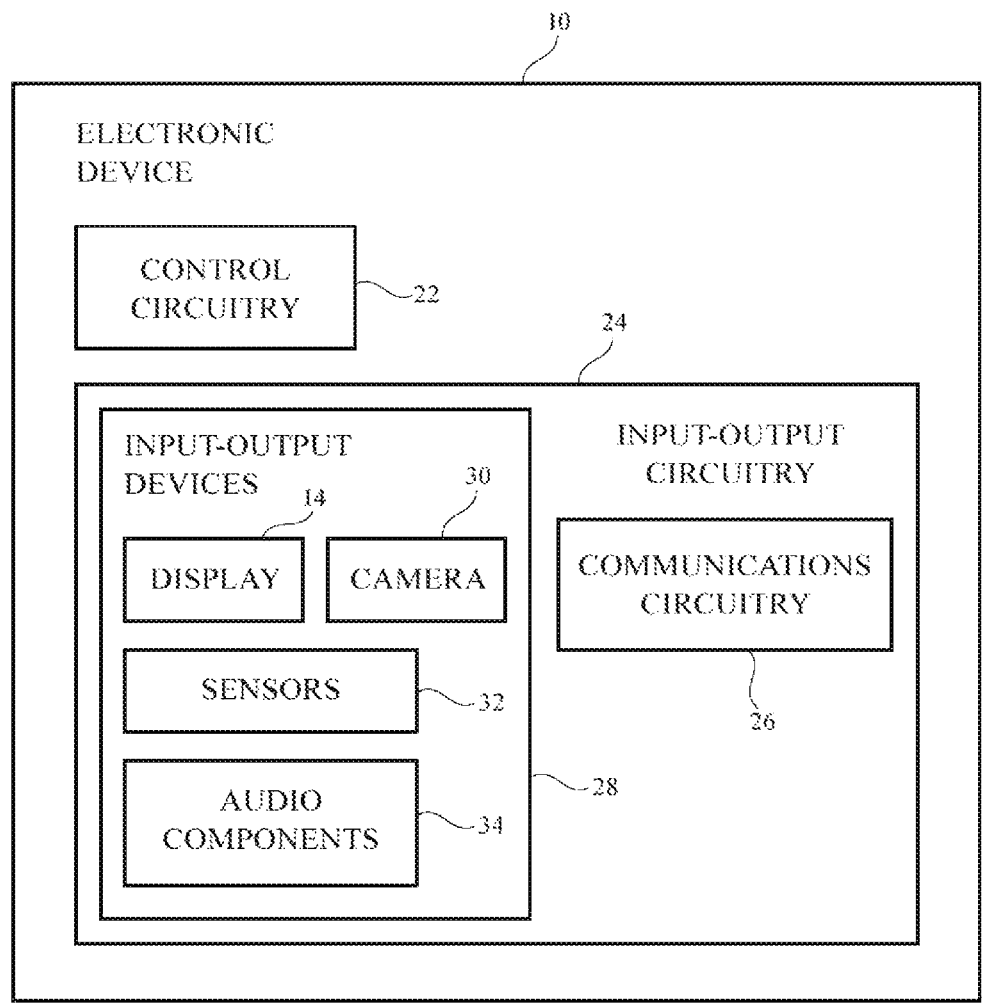
FIG. 2 is a schematic diagram of an illustrative electronic device in accordance with an embodiment.

FIG. 2 is a schematic diagram of device 10. As shown in FIG. 2, electronic device 10 may have control circuitry 22. Control circuitry 22 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. The processing circuitry may be based on one or more microprocessors, microcontrollers, digital signal processors, baseband processors, power management units, audio chips, application specific integrated circuits, etc.

Control circuitry 22 may be configured to execute instructions for implementing desired control and communications operations in device 10 and systems including multiple devices such as device 10. For example, control circuitry 22 may be used in processing sensor data, processing user input, processing information received via wireless communications circuitry, and/or other information to determine when to operate device 10 in an independent mode or in a joint operating mode with other devices and to determine which capabilities device 10 and/or other devices should be provided with during these operating modes.

Control circuitry 22 may perform these operations using hardware (e.g., dedicated hardware or circuitry) and/or software code (e.g., code that runs on the hardware of device 10 such as control circuitry 22). Software code may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 22 during operation.

Device 10 may have input-output circuitry 24. Input-output circuitry 24 may be configured to gather input from users, external devices, and the surrounding environment and may be configured to supply output to users, external devices, and the surrounding environment. As shown in FIG.

2, input-output circuitry 24 may include communications circuitry 26 and input-output devices 28.

Communications circuitry 26 may include transceiver circuitry (transmitters and/or receivers) for supporting wired and wireless communications. For example, communications circuitry 26 may support data communications between device 10 and another electronic device over a serial or parallel data path. Device 10 may have communications ports (e.g., Universal Serial Bus ports, etc.) for receiving mating data cables. The data cables can be used to carry data between device 10 and other electronic equipment (e.g., peer devices, etc.).

Communications circuitry 26 may include also wireless communications circuitry for communicating wirelessly with external equipment. The wireless communications circuitry may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Communications circuitry 26 may include radio-frequency transceiver circuitry for handling various radio-frequency communications bands. For example, circuitry 26 may include transceiver circuitry that transmits and receives data in 2.4 GHz and 5 GHz bands for WiFi® (IEEE 802.11) communications and the 2.4 GHz Bluetooth® communications band. Circuitry 26 may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 26 may handle voice data and non-voice data. Wireless communications circuitry in circuitry 26 can include circuitry for other short-range and long-range wireless links if desired. For example, circuitry 26 may include millimeter wave communications circuitry (e.g., circuitry for supporting 60 GHz communications and communications in other millimeter wave bands), circuitry for receiving television and radio signals, paging system transceivers, near field communications (NFC) circuitry, etc. Circuitry 26 may also include global positioning system (GPS) receiver equipment for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Communications circuitry 26 may include one or more antennas. These antennas may be located at one or both ends of device 10, along the sides of device 10, at the corners of device 10, in the middle of the rear face of device 10, and/or at other locations within housing 12. Antennas for device 10 may be formed using any suitable antenna types. For example, antennas in circuitry 26 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. Device 10 may include impedance sensors (e.g., impedance measurement circuitry that measures the impedance of antennas and/or other radio-frequency components in circuitry 26). These sensors may be used by the control circuitry of device 10 in detecting when external objects are in the vicinity of device 10 (e.g., when part of device 10 is being held in the hand of a user, when part of device 10 such as an edge of device 10 is adjacent to another electronic device, etc.).

Input-output devices 28 may include status-indicator lights (e.g., light-emitting diodes), light-emitting diodes for providing camera flash illumination and other light, buttons, joysticks, scrolling wheels, key pads, keyboards, audio components 34 such as microphones and speakers (e.g., an ear speaker located at an upper end of device 10 and/or one or more speaker-phone speakers at an opposing lower end of device 10 or elsewhere in device 10 that are used to play audio when device 10 is being held away from a user's head), tone generators, haptic devices such as vibrators, cameras such as camera 30 (e.g., front-facing and/or rear-facing cameras), sensors 32, displays such as display 14, and other input-output components that gather input and provide output from device 10. Input-output devices 28 (e.g., sensors 32) may include touch sensors (e.g., stand-alone touch sensors for touch sensitive buttons and track pads and/or touch sensor panels that overlap display 14 and are used in gathering touch screen input from a user as selectable on-screen options are displayed on display 14). Sensors 32 may also include light sensors, orientation sensors (e.g., accelerometers, gyroscopes, compasses, and/or other components that can detect device motion and/or device orientation such as device orientation relative to the Earth), resistance sensors (e.g., sensors that can detect contact by a conductive sidewall of another device or other external object), switch-based sensors, capacitance sensors, proximity sensors (e.g., a capacitive proximity sensor and/or a light-based proximity sensor such as an infrared proximity sensor that makes proximity sensor measurements by emitting infrared light from an infrared light-emitting diode and measuring corresponding reflected light using an infrared light detector), magnetic sensors, force sensors (e.g., force sensors based on a capacitive force sensing arrangement, strain gauges, piezoelectric force sensors, and/or other transducers that convert force into electrical signals), gas pressure sensors (e.g., sensors for measuring air pressure), gas sensors (e.g., carbon dioxide sensors), particulate sensors, moisture sensors, a connector port sensor or other sensor that determines whether first device 10 is mounted in a dock, and other sensors and input-output components.

Figure 3:
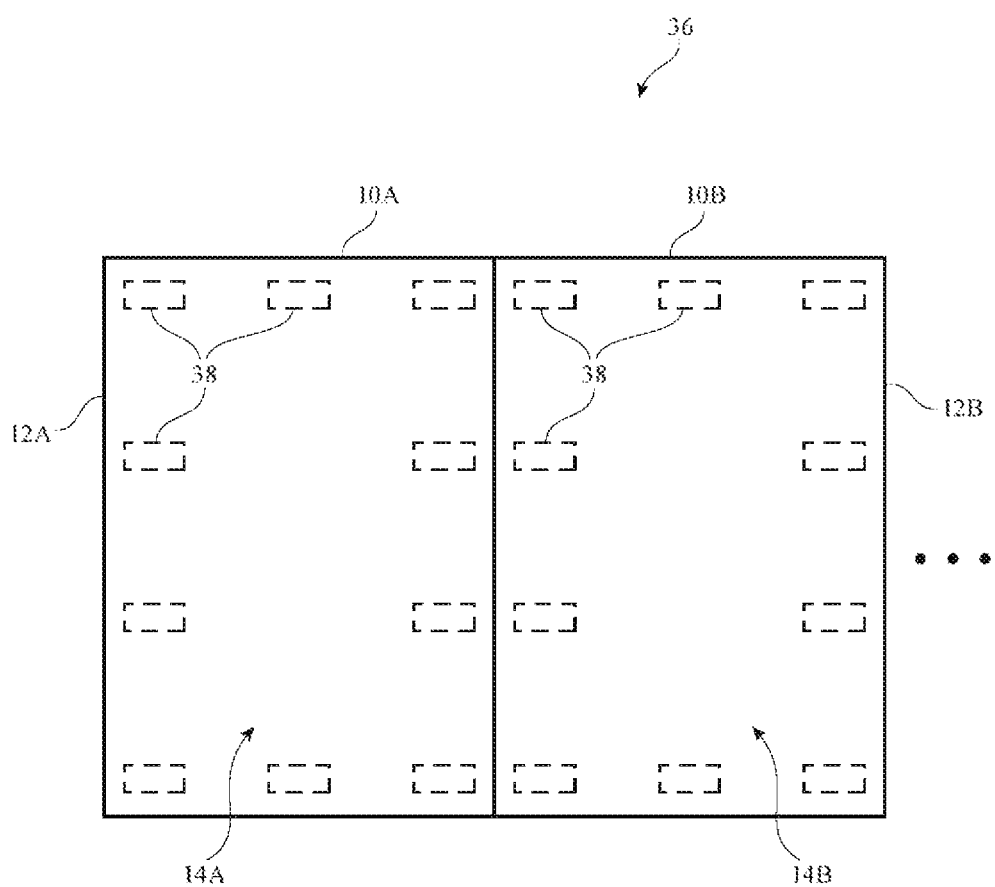
FIG. 3 is a diagram of a pair of adjacent electronic devices in accordance with an embodiment.

Devices such as device 10 can be used in isolation or, when brought into the vicinity of additional devices such as device 10 can be used in joint operating modes. An illustrative system in which two electronic devices have been placed adjacent to each other for use in a joint operating mode is shown in FIG. 3. As shown in FIG. 3, system 36 may include multiple electronic devices such as device 10 of FIGS. 1 and 2. System 36 may, as an example, include a pair of devices, two or more devices, three or more devices, four or more devices, five or more devices, 2-4 devices, fewer than five devices, fewer than four devices, or other suitable number of electronic devices 10.

In the example of FIG. 3, system 36 includes first electronic device 10A and second electronic device 10B. Devices 10A and 10B may be peer devices (e.g., devices 10A and 10B may both be cellular telephones, may both be wristwatch devices, may both be tablet computers, may both be laptop computers, may both be desktop computers, etc.)

or devices 10A and 10B may be different types of devices. For example, device 10A may be a tablet computer and device 10B may be a cellular telephone, device 10A may be a laptop computer, and device 10B may be a tablet computer, device 10A may be a cellular telephone and device 10B may be a wrist watch device, etc. In some configurations, devices 10A and 10B are of the same general type but have individual differences (e.g., devices 10A and 10B may be different cellular telephone models). Configurations for system 36 in which devices 10A and 10B have the same size and shape may sometimes be described herein as an example. This is however, merely illustrative. Devices 10A and 10B may have different shapes (e.g., outlines when viewed from the front that are circular, oval, triangular, hexagonal, rectangular, etc.) and/or may have different sizes (e.g., device 10A may have a housing 12 and/or a display 14 that is larger or smaller than the housing and/or display of device 10B, etc.).

As shown in FIG. 3, devices 10A and 10B may be oriented on a tabletop or other surface so that devices 10A and 10B are adjacent (e.g. so that one or more edges of housing 12A of device 10A abuts one or more edges of housing 12B of device 10B). In the example of FIG. 3, the right-hand edge of housing 12A is aligned with and touching a corresponding left-hand edge of housing 12B, so that display 14A of device 10A and display 14B of device 10B can effectively form a single larger display and so that other resources of devices 10A and 10B can be used together. Other arrangements in which devices 10A and devices 10B are placed adjacent to each other (e.g., so that the housing sidewall along the periphery of one device abuts at least some of the housing sidewall along the periphery of another device) can be used, if desired.

Devices 10A and 10B may contain components 38 that are located within housings 12A and 12B. Components 38 may be located along one or more edge of devices 10A and 10B and/or may be located elsewhere within the housings of devices 10A and 10B. For example, one or more components 38 may be located along each peripheral edge of devices 10A and 10B so that sensing circuitry associated with components 38 can detect external objects around the periphery of each device (e.g. by making sensor measurements through sidewalls of housing 12 or through other portions of housing 12). In some configurations, components 38 may make sensor measurements through display 14.

If desired, components 38 may include magnetic components such as permanent magnets, electromagnets, and/or magnetic materials such as iron that are attracted to permanent magnets and electromagnets. These magnetic components help hold devices 10A and 10B adjacent to each other. If desired, components 38 and/or the housings of devices 10A and 10B may include interlocking male and female parts (e.g., pins and holes, interlocking grooves, or other engagement structures) that help hold devices 10A and 10B in desired positions relative to each other. Devices 10A and 10B may also be supported by removable sleeves, plastic or leather cases, covers that fold or bend, and/or other supporting structures.

Components 38 may include sensors such as sensors 32 of FIG. 2 for detecting when devices 10A and 10B are adjacent to each other. For example, components 38 may include magnetic sensors, force sensors, proximity sensors, antenna impedance sensors, light-based sensors, capacitive sensors, resistive sensors that measure resistance to determine when a metal object such as an electronic device housing is in contact with a given device, switch-based sensors, and/or other sensors that detect when the edge of one device housing abuts at least a portion of an edge of another device housing. Sensors in components 38 may also be configured to operate through the front and rear faces of the housings for devices 10A and 10B (e.g., to detect when devices 10A and 10B are overlapping in a front-to-front configuration, a back-to-back configuration, or a front-to-back configuration).

In general, devices 10 may have any suitable number of components 38 and these components may run along the edges of each device 10 (e.g., on the interior side of a housing sidewall formed from metal, plastic, and/or glass or other materials), and/or may be located at other locations within the interior of the housing for each device 10). The configurations of FIG. 3 are illustrative.

Sleeves and other support structures for supporting devices 10A and 10B (sometimes referred to herein as covers or cases) may be formed from plastic, metal, fabric, leather or other natural materials, and/or other materials. In some configurations, covers for system 36 may be foldable.

Figure 4:
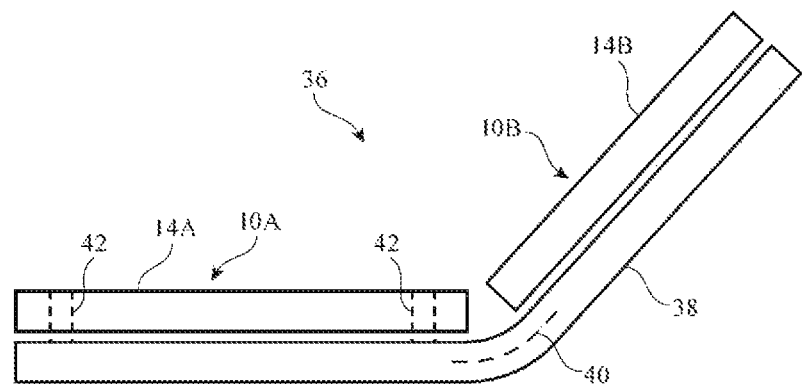
FIG. 4 is a side view of a pair of electronic devices supported by a bendable case with an internal hinge structure in accordance with an embodiment.

FIG. 4 is a cross-sectional side view of system 36 in which devices 10A and 10B are supported by a foldable support structure such as cover 38. Cover 38 of FIG. 4 has hinge structures 40 that help hold cover 38 in a desired bent shape (e.g., to support device 10B at an non-zero angle with respect to device 10A, so that device 10A can serve as a touch sensitive virtual keyboard while device 10B serves as a display for presenting a document or other content to a user, etc.). Hinge structures 40 may be formed from interlocking rotatable structures (e.g., a clutch barrel assembly), may include bendable metal or plastic structures (e.g., bendable strip-shaped members that retain their shape when forced into a particular bent or flat position by a user), or other hinge mechanisms. Hinge structures 40 allow a user to place devices 10A and 10B in a planar configuration (e.g., lying flat on a table so that devices 10A and 10B and their respective displays lie in a common plane) or in a bent configuration of the type shown in FIG. 4 in which the surface normal of the display of device 10A is oriented at a non-zero angle with respect to the surface normal of the display of device 10B and which devices 10A and 10B do not lie in a common plane). Attachment structures 42 (e.g., straps, magnets, adhesive, screws or other fasteners, clamps, etc.) may be used in removably attaching devices 10A and 10B to cover 38.

Figure 5:
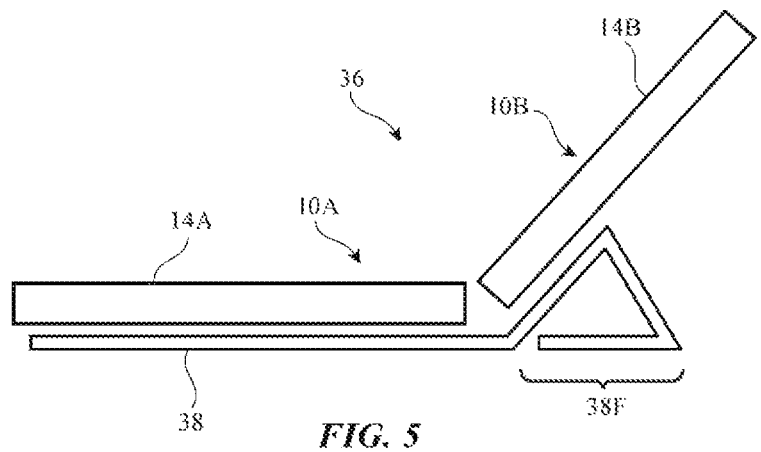
FIG. 5 is a side view of a pair of electronic devices supported by a folded case in accordance with an embodiment.
Figure 6:
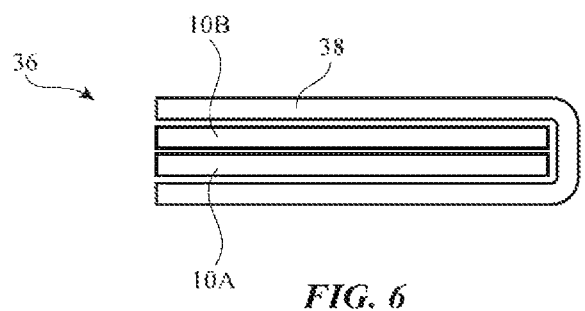
FIG. 6 is a side view of a pair of electronic devices in a case that has been folded back on itself in accordance with an embodiment.

As shown in the example of FIG. 5, cover 38 may have a foldable portion such as portion 38F that can be folded into a shape that supports device 10B at a non-zero angle with respect to device 10A. FIG. 6 shows how cover 38 may be folded 180° to allow the front faces of devices 10A and 10B to face each other. If desired, covers 38 of FIGS. 5 and 6 may be provided with hinge structures such as hinge structures 40. Configurations for cover 38 that support three or more devices 10, that allow devices 10A and 10B to be placed into front-to-back and back-to-back configurations, and/or that allow devices 10A and 10B to be supported in other orientations relative to each other may also be used. In some arrangements, device 10A may be coupled to cover 38 while magnetic components are used in oriented device 10B relative to device 10A or magnetic components and cover 38 may be used together in other configurations. For example, cover 38 may form a base to which device 10A may be attached while magnetic components are used in coupling device 10B to device 10A at a desired angle (e.g., a non-zero angle).

FIGS. 7, 8, 9, and 10 show illustrative configurations in which devices 10A and 10B are oriented relative to each other using magnetic components (see, e.g., components 38 along the peripheral edges of devices 10A and 10B in FIG. 3). When the edges of the housings of devices 10A and 10B are brought together with this type of arrangement, magnetic attraction between magnetic components in respective portions of devices 10A and 10B hold devices 10A and 10B together. Device housings 12A and 12B may have curved sidewalls, flat (vertical) sidewalls, or sidewalls with other suitable cross-sectional profiles.

Figure 7:
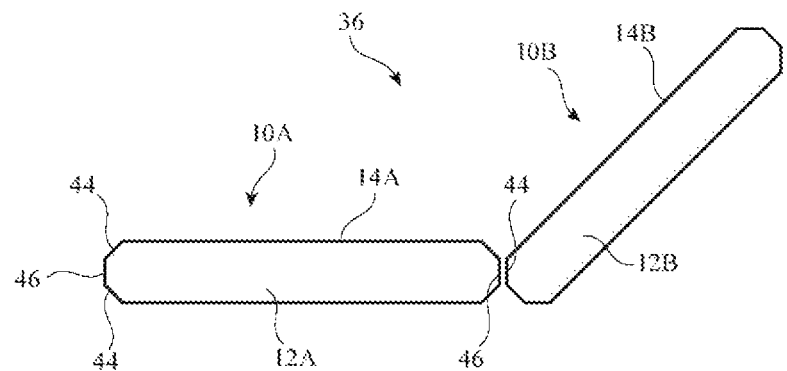
FIG. 7 is a cross-sectional side view of a pair of illustrative electronic devices with beveled housing sidewalls that have been joined at a desired angle with respect to each other using magnetic attraction and the angled surfaces of the sidewalls in accordance with an embodiment.
Figure 8:
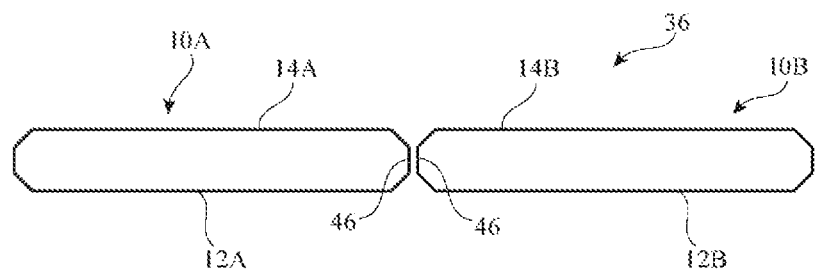
FIG. 8 is a cross-sectional side view of the pair of electronic devices with beveled housing sidewalls of FIG. 7 in a planar configuration in accordance with an embodiment.

In some configurations, the sidewall profile of devices 10A and 10B may help orient devices 10A and 10B relative to each other while the respective abutting edges of devices 10A and 10B are pulled together by magnetic attraction. As shown in FIG. 7, for example, housings 12A and 12B may have beveled sidewalls each of which has two beveled 45° sidewall surfaces 44 and one vertical sidewall surface 46. In the configuration of FIG. 7, one of surfaces 46 bears against to one of surfaces 44 (e.g., magnetic attraction from magnetic components in housings 12A and 12B couple these surfaces together), so that device 10B is oriented at 45° relative to device 10A (e.g., so that device 10A can serve as a touch sensitive virtual keyboard while device 10B serves as a display for presenting a document or other content to a user, etc.). In the illustrative configuration of FIG. 8, one of vertical sidewall surfaces 46 of device 10A abuts one of vertical sidewall surfaces 46 of device 10B, so that devices 10A and 10B are held in a planar orientation relative to each other.

Figure 9:
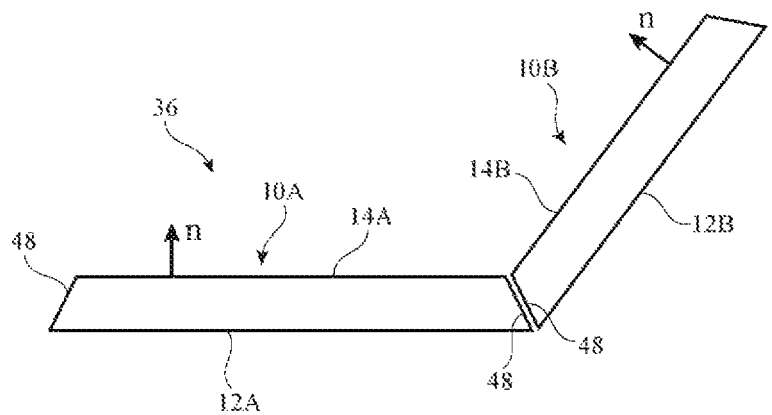
FIG. 9 is a cross-sectional side view of a pair of illustrative electronic devices with angled housing sidewalls that have been joined at a desired angle with respect to each other using magnetic attraction in accordance with an embodiment.
Figure 10:
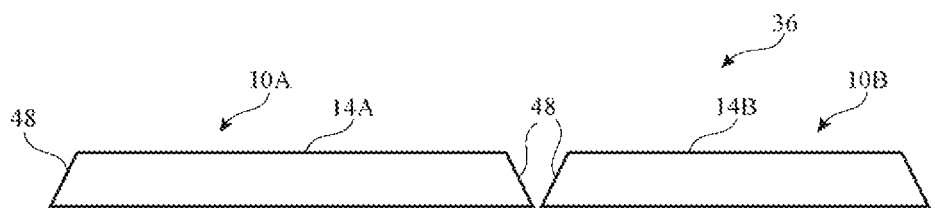
FIG. 10 is a cross-sectional side view of the pair of illustrative electronic devices of FIG. 9 in a planar orientation in accordance with an embodiment.

In the illustrative arrangement of FIGS. 9 and 10, device housings 12A and 12B have angled (outwardly sloped) sidewall surfaces 48 each of which is oriented at a non-zero angle with respect to surface normal n of displays 14A and 14B, respectively. When placed so that sidewall surfaces 48 press against each other and lie in the same plane as shown in FIG. 9, device 10B is supported at a non-zero angle with respect to device 10A. When placed so that sidewall surfaces 48 are not in direct contact, devices 10A and 10B may rest side-by-side in the adjacent device configuration of FIG. 10 (e.g., so that displays 14A and 14B lie in the same plane).

Figure 11:
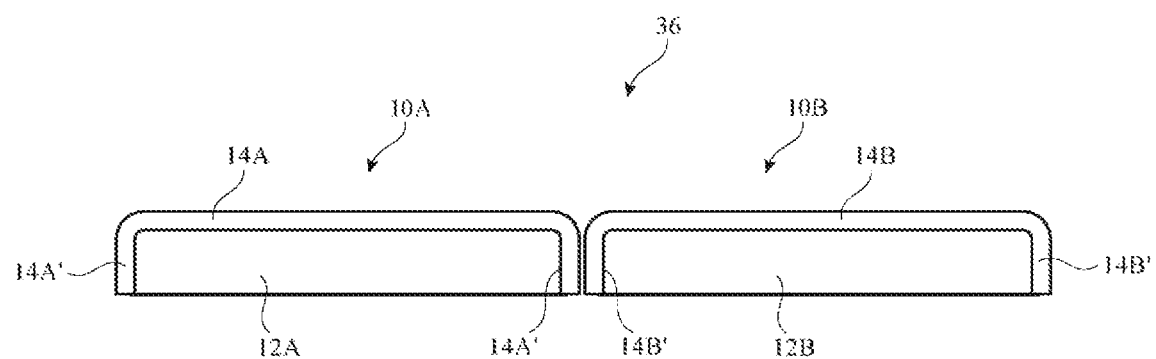
FIG. 11 is a cross-sectional side view of a pair of adjacent electronic devices each of which has a display that covers housing sidewalls in accordance with an embodiment.

Display 14 may cover some or all of the front face of device 10. If desired, display 14 may have portions that extend over some or all of the sidewalls of housing 12. As shown in FIG. 11, for example, display 14 may have left and right edges that fold down over the left and right sidewalls of each device. When placed adjacent to each other as shown in FIG. 11, abutting sidewall portions 14A' and 14B' of displays 14A and 14B, respectively, may be disabled. This allows content (e.g., videos, text, and/or other images) to be displayed in a seamless fashion across the exposed front face surfaces of displays 14A and 14B. The outermost portions 14A' and 14W of the displays of FIG. 11 (e.g., portion 14N on the left of device 10A and portion 14B' on the right of device 10B) may be used to display extended portions of the image displayed on the front faces of devices 10A and 10B, may be used to display virtual buttons for system 36, and/or may be temporarily deactivated.

Figure 12:
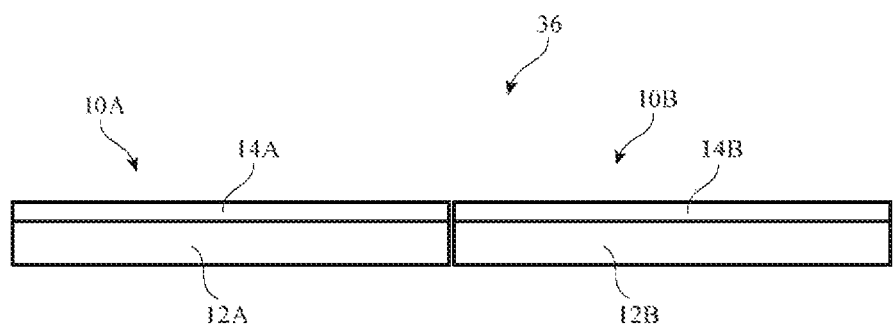
FIG. 12 is a cross-sectional side view of a pair of adjacent electronic devices each of which has a display that is borderless along at least its left and right edges in accordance with an embodiment.

In the arrangement of FIG. 12, displays 14A and 14B have borderless configurations, so that images can be displayed seamlessly across displays 14A and 14B when devices 10A and 10B are adjacent (e.g., when the sidewalls of device housings 12A and 12B abut). Other configurations for devices 10A and 10B may be used, if desired (e.g., configurations in which one or more edges of display 14 has an inactive border).

Figure 13:
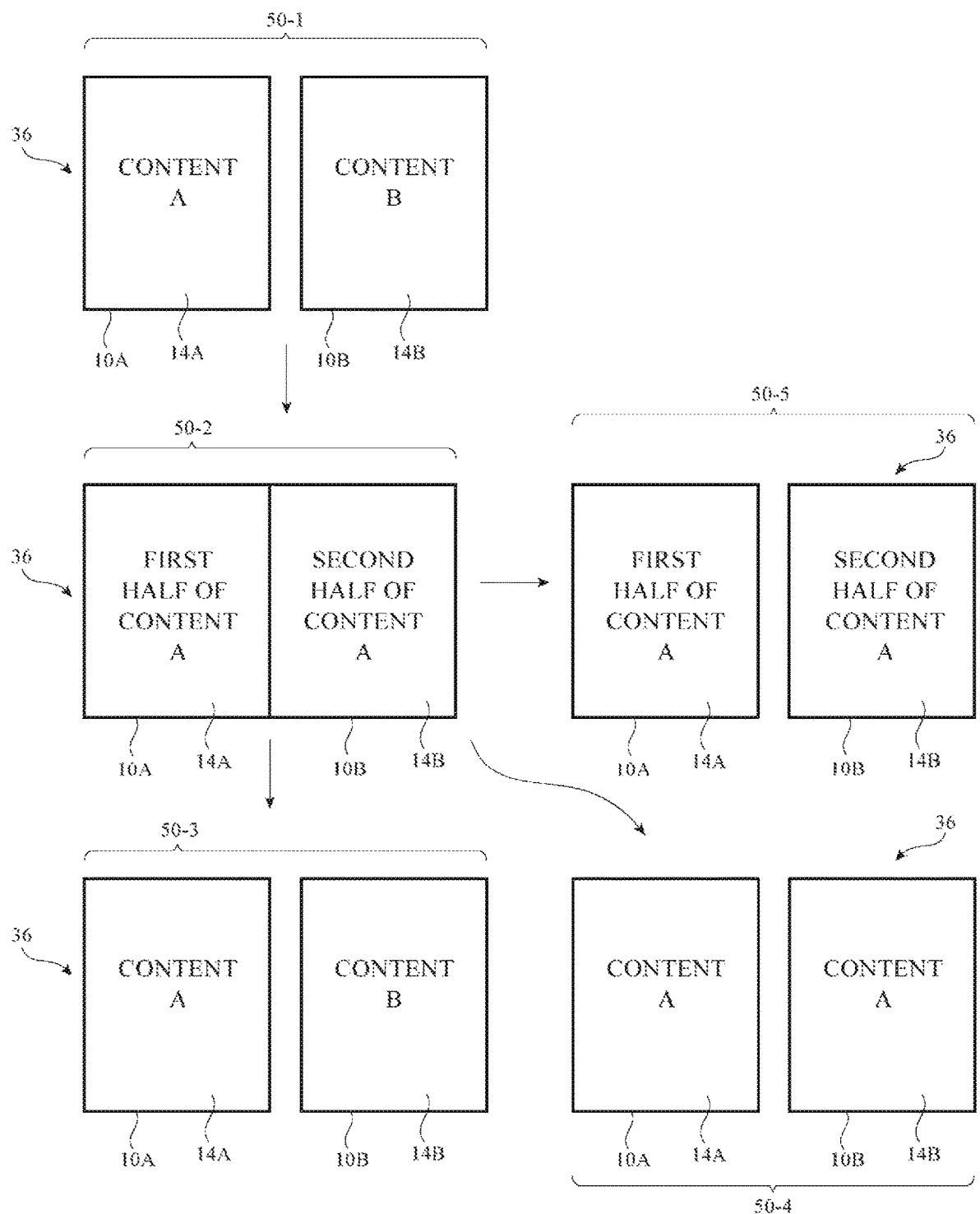
FIG. 13 is a diagram showing how a system with multiple electronic devices may present content to a user in various contexts in accordance with an embodiment.

FIG. 13 illustrates how devices 10A and 10B may behave when brought together and pulled apart.

Initially, devices 10A and 10B of system 36 may be in an independent operating mode represented by state 50-1. In state 50-1, devices 10A and 10B are separated by an air gap and are not adjacent to each other. Sensors in components 38 can apply measured sensor signals to predetermined adjacency thresholds (adjacency criteria such as a minimum separation distance, sidewall alignment criteria, angular orientation criteria, etc.) to determine whether devices 10A and 10B are adjacent or are separated. When separated as shown in state 50-1, each device can operate independently. A single user may operate both devices or each device may be operated by a respective user.

Components 38 may monitor whether devices 10A and 10B are adjacent. Wireless communications (e.g., handshaking) between devices 10A and 10B to determine whether devices 10A and 10B are adjacent and/or other techniques for determining adjacency may also be used. In response to detecting that devices are adjacent, system 36 may transition to a joint (adjacent) operating mode, as illustrated by state 50-2 of FIG. 13.

In state 50-2, some or all of the functions of devices 10A and 10B may continue to operate independently. For example, devices 10A and 10B may display separate content on their respective displays (e.g. a first web page on device 10A and a second web page on device 10B) and/or may play separate audio. At the same time, the joint operating mode may allow at least some of the functions of devices 10A and 10B to be shared. As an example, a wireless communications circuit in device 10A may transmit and receive data for both device 10A and device 10B (and this data may be exchanged locally between devices 10A and 10B using a wired or wireless link between devices 10A and 10B) or measurements from an ambient light sensor in device 10A may be used in controlling screen brightness in the displays of both devices 10A and 10B.

If desired, devices 10A and 10B may operate in a coordinated fashion during the joint mode of state 50-2 so that most or all functions of the devices are coordinated. For example, images that are displayed may be expanded to stretch across displays 14A and 14B to provide a user with an expanded display area, stereo audio may be played from a first speaker in device 10A and a second speaker in device 10B, touch input may be gathered from displays 14A and 14B so that a user can drag on-screen items from display 14A to display 14B or can make touch gestures that extend across displays 14A and 14B, wireless communications capabilities of devices 10A and 10B may be combined to provide enhanced bandwidth and/or additional bands of coverage, etc.

In some arrangements, devices 10A and 10B may be operated in a master-slave (mother/child) configuration. In this type of arrangement, the operation of one device is used in controlling the operation of another device. As an example, device 10A may display a virtual keyboard for system 36 and device 10B may display documents or other content that is being controlled by input supplied to the keyboard. Device 10A may also serve as video controller device, a color picker input area, brush selection area, or other input area for an image editing application that is displaying an edited image on device 10A, may serve as a game controller pad or video playback controller pad with stop, pause, forward, and reverse button for device 10B, or may otherwise serve as a touch controller for device 10B.

Operations in each of these modes need not be mutually exclusive. For example, devices 10A and 10B may initially be operated independently in all respects (state 50-1). In joint mode (state 50-2), a first device function (e.g., use of wireless communications circuitry 26 to receive email messages) may remain separate on each device, a second device function (e.g., audio playback) may be shared (e.g., by presenting the audio in a synchronized stereo arrangement in which a speaker in device 10A provide left channel audio for an audio track while a speaker in device 10B simultaneously provides right channel audio for the same track), and a third device function (e.g., use of displays 14A and 14B) may be implemented using a master-slave arrangement (e.g., device 10A may use display 14A as a touch keyboard and device 10B may use display 14B as a display to present an edited image or other content to a user).

With the illustrative configuration of FIG. 13, devices 10A and 10B initially present separate content (respectively, content A and content B) to their respective users (or to a single user of both devices). When placed adjacent to each other so that system 36 operates in joint state 50-2, content A is presented using both displays 14A and 14B, whereas content B is no longer presented. Content A may be, for example, a video whereas content B may be a desktop screen containing an array of selectable icons. A user may be playing the video on device 10A when device 10B is brought into contact with device 10A. When this configuration is detected, devices 10A and 10B can operate together to display a first half of content A on device 10A and a second half of content A on device 10B. In this way, the user may benefit from an enlarged display area and expanded stereo sound (by using respective speakers in devices 10A and 10B to present stereo to the user).

During joint operating mode (state 50-2), devices 10A and/or 10B may use components 38 (e.g., sensors 32) and optional handshaking procedures (e.g., messages relayed between devices 10A and 10B wirelessly upon detection of adjacency using sensors 32) to determine whether devices 10A and 10B are adjacent. In response to detecting that devices 10A and 10B are no longer adjacent, devices 10A and 10B may transition to an updated operating mode such as a mode corresponding to one of operating states 50-3, 50-4, and 50-5 of FIG. 13. The behavior of devices 10A and 10B after devices 10A and 10B are separated (e.g., whether system 36 transitions to state 50-3, 50-4, or 50-5) can depend on the configuration of devices 10A and 10B during operating state 36 and/or other criteria.

Consider, as an example, a first scenario in which devices 10A and 10B are displaying a video that stretches across displays 14A and 14B in state 50-2. The video (content A in this example) originated from device 10A (via streaming or a video stored in storage in the control circuitry of device 10A). When devices 10A and 10B are separated, system 36 transitions to the operating mode of state 50-3. In state 50-3, device 10A continues to display the same video with its audio track, so that the user's viewing of the video is not disrupted. Device 10B reverts to its original operating mode and displays content B (which may be, for example, a list of selectable icons on a desktop, an email inbox, or other functionality that is potentially specific to device 10B).

In a second illustrative scenario, devices 10A and 10B transition from state 50-2 to state 50-4 when separated. In state 50-2, content for a video is spread across displays 14A and 14B. In this example, the content is being watched by two users who decided to share their screens during the joint operating mode of state 50-2. When the two users need to separate their devices 10A and 10B (e.g., for more convenient viewing angles, because the users are departing for different destinations, etc.), both users desire to continue viewing the video. Accordingly, in this second operating scenario, the video (content A) is displayed separately (in its entirety) on each of displays 14A and 14B. If the video was initially stored locally on only one of the devices, the video can be transferred to the other device during state 50-2 (e.g., using a local communications link between devices 10A and 10B) or that other device can retain access to the video by automatically switching to an on-line video streaming delivery mode when the devices are separated. In scenarios in which the shared content on system 36 of state 50-2 is a website, the website can be displayed separately on both display 14A and 14B in state 50-4.

In a third illustrative scenario, devices 10A and 10B transition from state 50-2 to state 50-5 when separated. The content displayed on displays 14A and 14B of system 36 in state 50-2 may correspond to a game with two users. In the combined display arrangement of state 50-2, a first user's portion of the game (e.g., the first user's game controller and/or a first portion of a game playing space) is displayed on display 14A, whereas a second user's portion of the game (e.g., the second user's game controller and/or a second portion of the game playing space) is displayed on display 14B. Upon transitioning to state 50-5, the first user's game controller and/or the first portion of a game playing space may continue to be displayed on display 14A, whereas the second user's game controller and/or the second portion of the game playing space is displayed on display 14B. This allows the two users to continue to play a shared game (perhaps in a mode in which it is desirable for each user's input to their game controller to not be revealed to the opposing user). At a later stage of game play, the users may recombine their devices to revert to state 50-2. Local wireless communications links or communications links that pass through the internet may be used to allow the first and second user's to play the shared game in state 50-5.

Figure 14:
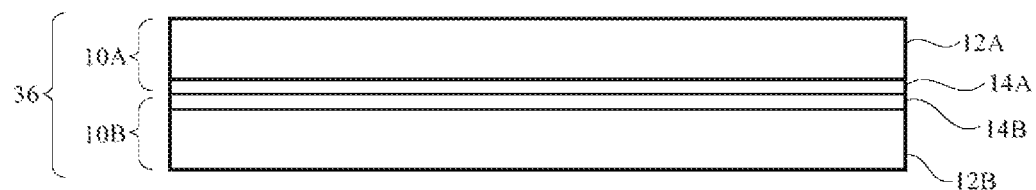
FIG. 14 is a cross-sectional side view of a system in which two devices are in a face-to-face configuration in accordance with an embodiment.
Figure 15:
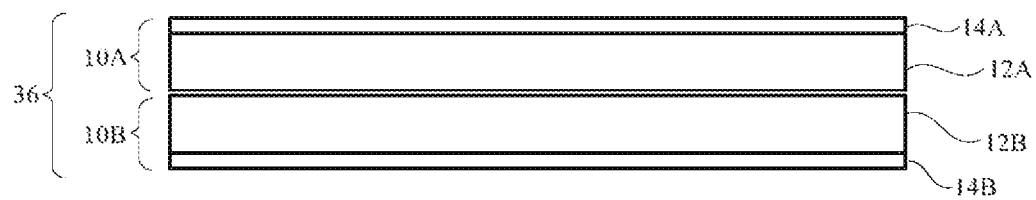
FIG. 15 is a cross-sectional side view of a system in which two devices are in a back-to-back configuration in accordance with an embodiment.
Figure 16:
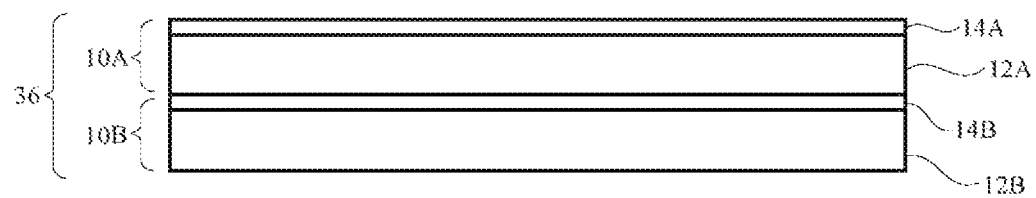
FIG. 16 is a cross-sectional side view of a system in which two devices are in a back-to-front configuration in accordance with an embodiment.

In some joint operating modes, devices 10A and 10B may be oriented so that they overlap each other in a front-to-front configuration in which their displays overlap and face each other (see, e.g., the arrangement of FIG. 14), in a back-to-back configuration in which their displays overlap and face away from each other so that their rear faces are facing each other (see, e.g., the arrangement of FIG. 15), or in a front-to-back configuration in which their displays are facing in the same direction (see, e.g., FIG. 16). The orientation of devices 10A and 10B in these scenarios can be detected by components 38 and operation of devices 10A and 10B adjusted accordingly. When, for example, devices 10A and 10B are in a front-to-front configuration, displays 14A and 14B may be powered down to conserve power. When devices 10A and 10B are in a back-to-back configuration, one or both of displays 14A and 14B may be active. For example, a display facing up may be on and a display facing down may be turned off. The orientation of devices 10A and 10B relative to the Earth may be detected using an accelerometer in device 10A and/or device 10B. In a back-to-front configuration, it may be desirable to turn on the exposed display while turning of the covered (downward facing) display. In each of these joint operation modes, devices resources such as audio resources, communications circuitry, sensors, and other input-output circuitry 24 can be shared, if desired. Magnetic components (see, e.g., components 38) may be used in coupling devices 10A and 10B together in overlapping configurations.

Figure 17:
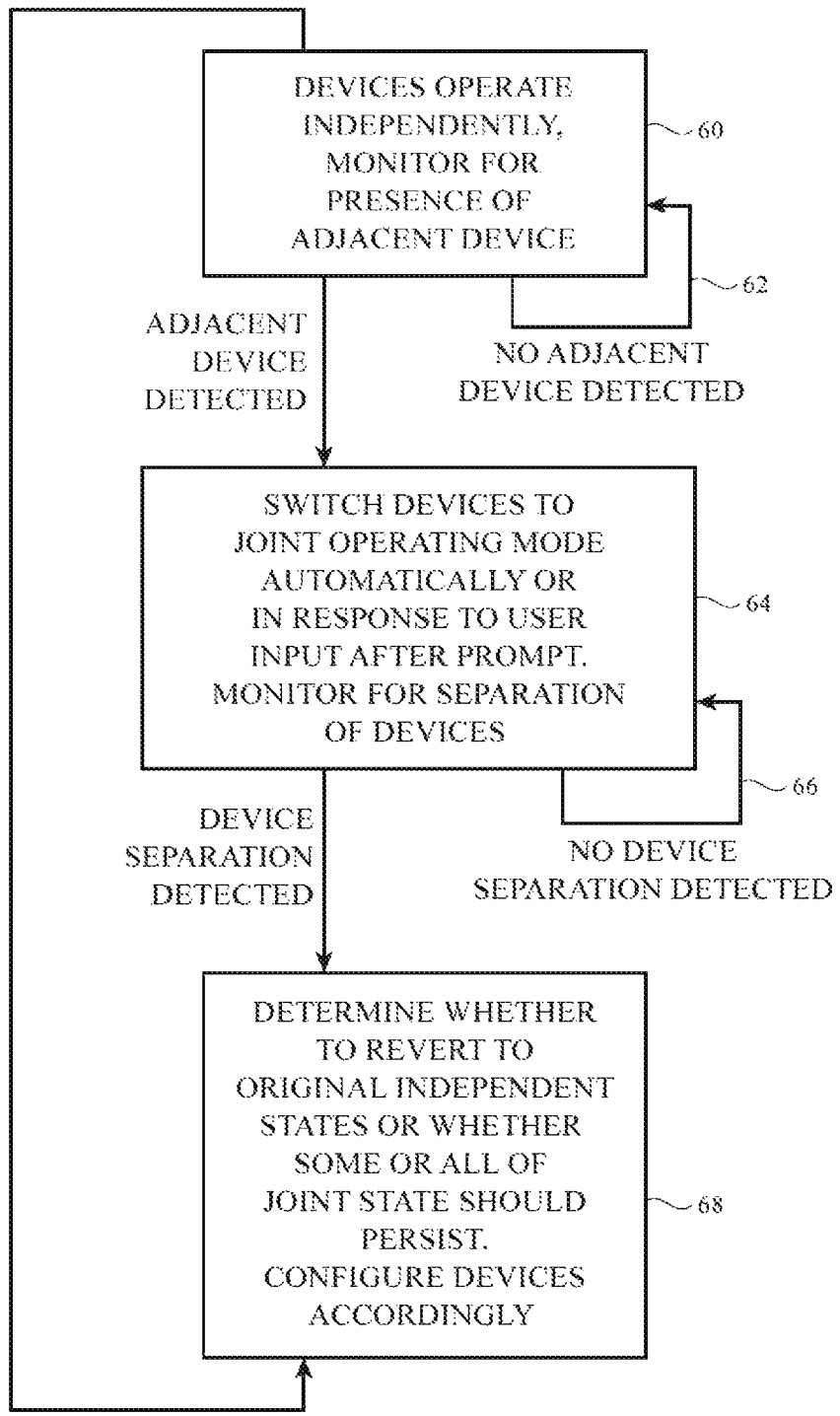
FIG. 17 is a flow chart of illustrative operations involved in using multiple electronic devices in accordance with an embodiment.

Illustrative operations involved in using multiple devices 10 (e.g., devices 10A and 10B) are shown in FIG. 17. During the operations of block 60, devices 10A and devices 10B may be operated in an independent operating mode (see, e.g., state 50-1 of FIG. 13). During this mode, device 10A and/or device 10B may use components 38 (e.g., sensors 32)

to monitor for adjacency between devices 10A and 10B. If desired, output from components 38 in device 10A and/or device 10B may be used to initially detect that a sidewall along an edge of device 10B is adjacent to one of the sidewalls along an edge of device 10A and this initial detection may be confirmed using wireless communications between devices 10A and 10B (sometimes referred to as handshaking, authentication, or acknowledgment). For example, if device 10A detects the presence of a possible adjacent device, device 10A can issue a near-field communications request or other wireless request asking adjacent devices to identify themselves. In response, device 10B can use its sensor(s) 32 to confirm adjacency and can wirelessly provide device 10A with this information and/or information on the identity of device 10B and/or other information confirming that device 10B is authorized and desires to jointly operate with device 10A. Configurations in which devices 10A and/or 10B generate confirmatory patterns of magnetic fields (e.g., a magnetic field produced by device 10B that is detected by a magnetic sensor in device 10A), acoustic signals or vibrations (e.g., a sound or vibration that is generated by device 10B and detected by a microphone or accelerometer in device 10A), light (e.g., light from a light-emitting diode in device 10B that is detected by a light detector in device 10A), and/or other in which devices 10A and 10B otherwise generate unidirectional and/or bidirectional localized confirmatory information may also be used in determining adjacency. Simultaneous accelerometer signatures (e.g., simultaneous bumps that are detected by the accelerometers in each device when the devices first contact each other) may also be used as part of an adjacency detection scheme. In general, adjacency between devices 10A and 10B can be determined by using data from adjacency detection sensors, receipt of wireless communications from an adjacent device, and/or other operations that take place in one of devices 10A and 10B or that take place in both devices 10A and 10B. Configurations in which adjacency status information (e.g., sensor readings indicative of device adjacency) is shared between devices 10A and 10B (e.g., when adjacency is confirmed when device 10A detects the presence of device 10B with a sensor in device 10A and when device 10B detects the presence of device 10A with a sensor in device 10B) may enhance adjacency detection reliability. In response to determining that devices 10A and 10B are not adjacent (from information gathered using one or more of sensors 32 and/or other detection mechanisms), monitoring may continue at block 60, as indicated by line 62.

In response to determining that devices 10A and 10B are adjacent (e.g., in response to detection of adjacency by the control circuitry and sensors of either device 10A or device 10B or both and/or confirmation using other adjacency detection/confirmation mechanisms), devices 10A and 10B may transition to a joint operating mode (block 64). The transition to joint operation may take place automatically or may proceed in response to user confirmation by the user of device 10A and/or the user of device 10B that joint operation is desired and authorized. As an example devices 10A and 10B may display an on-screen interactive prompt asking each user (e.g., if there are two users) to enter a password and to confirm that joint operation is desired. Devices 10A and 10B may then proceed to operate in a joint operating mode, as described in connection with state 50-2 of FIG. 13.

In the joint operating mode, one or more resources in device 10A may be shared with one or more corresponding resources in device 10B. As an example, graphics circuitry in the control circuitry of each device may be shared so that images can be displayed across a combined display formed from each of the adjacent displays. During image presentation operations, the graphics circuitry (e.g., a graphics processing unit) in one device may, as an example, render content for both displays and may transfer this content to respective display driver circuitry in each device for displaying on the display of that device. A local wireless link between devices 10A and 10B can be used to transfer content to be displayed from device 10A to device 10B (as an example) or, in some configurations, devices 10A and 10B may independently gather their portions of the content to be displayed from an on-line source or other remote source. Local rendering operations performed based on shared information (e.g., when each part of the shared content corresponds to a user's game controller and/or game playing space) may also be used. In some embodiments, content to be displayed across both displays may be divided before graphics rendering operations and a graphics processing unit in each device may handle rendering operations for its portion of the split content. Each device may have its own display driver circuitry coupled to a pixel array in its own display. The display driver circuitry of each device may be used in displaying an appropriate portion of the content for that device on its display.

As further examples, first and second microphones in devices 10A and 10B may be used jointly to capture stereo audio input, first and second cameras in devices 10A and 10B respectively may be used to capture stereo (e.g., three dimensional) images, first and second respective cameras may be used to gather user free-space gestures (e.g. using triangulation to gather three-dimensional gesture input), or first and second respective cameras may be used to capture image recognition images of a user's face from first and second respective perspectives. Touch screen functionality may be merged across displays 14A and 14B (e.g., to allow icons and other items to be dragged from one display to another, to allow a user touch gesture to extend across multiple displays, to allow a stylus, finger, or other input device to draw a line that extends across multiple displays, etc.). Wireless circuitry in devices 10A and 10B may be used jointly (e.g., to double downloading and uploading bandwidth by combining data streams from the two devices), wired circuitry in devices 10A and 10B may be used jointly (e.g., to allow multiple accessories to be coupled to system 36—one of which is coupled to a port in device 10A and another of which is coupled to a port in device 10B), and other communications and control functions can be operated jointly.

If desired, sensors such as ambient light sensors and proximity sensors may be used jointly. For example, if an ambient light sensor in device 10A is shadowed by a user's hand, readings from an ambient light sensor in device 10B may be used in adjusting the screen brightness for the combined display formed from displays 14A and 14B. Proximity sensor measurements may be gathered from respective proximity sensors in devices 10A and 10B (e.g., to determine whether a user is placing the user's ear next to an ear speaker in either device 10A or device 10B).

To conserve power, some circuitry may be disabled in one device while the circuitry of the other device is used for both devices 10A and 10B. For example, when devices 10A and 10B are used jointly, global positioning system circuitry in one device may be disabled to conserve power while global positioning system circuitry in the other device is enabled to gather satellite navigation system readings.

Displays 14A and 14B may, if desired, use common brightness and color balance (white point) settings so that content appears uniform across displays 14A and 14B. Devices 10A and 10B can revert to their original settings when separated or can (at least temporarily) retain shared joint operating mode settings.

Components 38 (e.g., sensors 32) in devices 10A and/or 10B can monitor for device adjacency during the joint operations of block 64. For example, one or both devices may make sensor measurements to detect when devices 10A and 10B are pulled apart and/or wireless communications between devices 10A and 10B may be used in determining when devices 10A and 10B are no longer adjacent. So long as devices 10A and 10B are positioned so that devices 10A and 10B are adjacent (e.g., so that the edges of devices 10A and 10B abut one another in a side-by-side or overlapping arrangement) and a wired or wireless communications link is supported between devices 10A and 10B so that the control circuitry of devices 10A and 10B can share information and otherwise operate cooperatively to support joint operation, processing may continue at block 64, as indicated by line 66. In response to detecting that devices 10A and 10B have been separated, system 36 may transition from a joint operating mode (e.g., state 50-2 of FIG. 13) to an appropriate separate (independent) operating mode (see, e.g., states 50-3, 50-4, and 50-5 of FIG. 13). During the operations of block 68, it may be determined which, if any, of the operating settings from the joint state are to persist on each of the separate devices before operation loops back to the independent operations of block 60. As an example, if devices 10A and 10B were jointly displaying a web page during the operations of block 64, the web page may continue to be displayed on each device after device separation (e.g. each device may display a browser window with the same web page). As another example, if devices 10A and 10B were playing stereo music through respective first and second speakers in devices 10A and 10B, device 10A (but not device 10B) may continue to play the music through its speakers upon device separation. In general, all joint operating parameters may be retained when devices 10A and 10B are separated, some joint operating parameters may be retained, or no joint operating parameters may be retained.

The foregoing is merely illustrative and various modifications can be made to the described embodiments. The foregoing embodiments may be implemented individually or in any combination.

What is claimed is:

1. A system, comprising:
   a first electronic device having first control circuitry and a first display; and
   a second electronic device having second control circuitry, a second display, and a sensor, wherein:
   the first control circuitry and the second control circuitry are configured to operate the first and second electronic devices in a joint operating mode when the first and second electronic devices are within a given distance of one another; and
   in the joint operating mode, user input to the first electronic device is used to control the second electronic device, the first and second electronic devices share resources, and a brightness of the first display is adjusted based at least partly on sensor data from the sensor in the second electronic device.

2. The system defined in claim 1 wherein the first and second displays are touch-sensitive.

3. The system defined in claim 1 wherein the first display displays first content while the second display displays second content that is different from the first content.

4. The system defined in claim 3 wherein the second control circuitry comprises graphics circuitry that renders the first content displayed by the first display.

5. The system defined in claim 3 wherein the second content comprises an array of selectable icons.

6. The system defined in claim 1 wherein the sensor comprises an ambient light sensor.

7. The system defined in claim 1 wherein the first electronic device comprises a tablet computer and the second electronic device comprises a laptop computer.

8. The system defined in claim 1 wherein the first control circuitry and the second control circuitry determine whether the first and second electronic devices are within the given distance of one another by exchanging wireless communication signals.

9. The system defined in claim 1 wherein the first display is touch-sensitive and wherein the user input comprises touch input on the first display that drags content on the first display to the second display.

10. The system defined in claim 1 wherein the first display displays an image editing application associated with the second electronic device.

11. A system, comprising:
    a first electronic device having first control circuitry, a first display, and an input device that receives user input; and
    a second electronic device having second control circuitry and a second display, wherein:
    the first control circuitry and the second control circuitry are configured to operate the first and second electronic devices in a joint operating mode when the first and second electronic devices are within a given distance of one another; and
    in the joint operating mode, the first and second electronic devices share resources and the user input is used to control content on the second display that is not being displayed on the first display.

12. The system defined in claim 11 wherein the first display displays additional content while the second display displays the content and wherein the additional content is different from the content.

13. The system defined in claim 11 wherein the input device comprises a keyboard.

14. The system defined in claim 11 wherein the first and second displays are touch-sensitive.

15. A system, comprising:
    a first electronic device having first control circuitry and a first touch-sensitive display that receives user input; and
    a second electronic device having second control circuitry and a second touch-sensitive display, wherein:
    the first control circuitry and the second control circuitry are configured to operate the first and second electronic devices in a joint operating mode when the first and second electronic devices are within a given distance of one another; and
    in the joint operating mode, the first and second electronic devices share resources and the user input is used to control the second touch-sensitive display.

16. The system defined in claim 15 wherein the first electronic device is a tablet computer and wherein the user input comprises stylus input.

17. The system defined in claim 15 wherein the first control circuitry and the second control circuitry determine whether the first electronic device and the second electronic device are within the given distance of one another by exchanging wireless communication signals.

18. The system defined in claim 15 wherein the first touch-sensitive display displays first content while second touch-sensitive display displays second content that is different from the first content.

19. The system defined in claim 18 wherein the second control circuitry comprises graphics circuitry that renders the first content displayed by the first touch-sensitive display.

\* \* \* \* \*

UNITED STATES PATENT AND TRADEMARK OFFICE
CERTIFICATE OF CORRECTION

PATENT NO. : 11,726,824 B2
APPLICATION NO. : 17/522730
DATED : August 15, 2023
INVENTOR(S) : James R. Wilson and David A. Pakula It is certified that error appears in the above-identified patent and that said Letters Patent is hereby corrected as shown below:

In the Claims

Column 17, Line 2, "while second" should read -- while the second --

Signed and Sealed this
Thirtieth Day of January, 2024

Katherine Kelly Vidal
*Director of the United States Patent and Trademark Office*